US011253907B2

(12) United States Patent
Linder et al.

(10) Patent No.: US 11,253,907 B2
(45) Date of Patent: Feb. 22, 2022

(54) ROLL-FORMING METHODS FOR MANUFACTURING ROLLER BEARING SEAL CASE

(71) Applicant: Inno-Spin LLC, Phillipsburg, NJ (US)

(72) Inventors: Maximilian Linder, Phillipsburg, NJ (US); James Myers, Chesterfield, VA (US)

(73) Assignee: Inno-Spin LLC, Phillipsburg, NJ (US)

( * ) Notice: Subject to any disclaimer, the term of this patent is extended or adjusted under 35 U.S.C. 154(b) by 0 days.

(21) Appl. No.: 16/846,198

(22) Filed: Apr. 10, 2020

(65) Prior Publication Data

US 2020/0238366 A1    Jul. 30, 2020

Related U.S. Application Data

(62) Division of application No. 15/784,101, filed on Oct. 14, 2017, now Pat. No. 10,661,326.

(51) Int. Cl.
| | |
|---|---|
| *B21D 19/04* | (2006.01) |
| *B21D 53/10* | (2006.01) |
| *F16C 33/78* | (2006.01) |
| *F16C 19/38* | (2006.01) |
| *F16C 19/36* | (2006.01) |
| *F16C 33/76* | (2006.01) |

(52) U.S. Cl.
CPC ........... *B21D 53/10* (2013.01); *B21D 19/046* (2013.01); *F16C 19/364* (2013.01); *F16C 19/386* (2013.01); *F16C 33/76* (2013.01); *F16C 33/7813* (2013.01); *F16C 2220/42* (2013.01); *F16C 2220/44* (2013.01); *F16C 2326/10* (2013.01)

(58) Field of Classification Search
CPC .................. F16J 15/328; F16J 15/3228; Y10T 29/49636; Y10T 29/49703; Y10T 29/49991; Y10T 29/53109
See application file for complete search history.

(56) References Cited

U.S. PATENT DOCUMENTS

| | | | | |
|---|---|---|---|---|
| 3,445,922 | A | * | 5/1969 | Leghorn .............. B22D 11/144 29/527.6 |
| 3,579,782 | A | * | 5/1971 | Hallerback ........... F16C 33/588 29/898.066 |
| 8,533,957 | B2 | | 9/2013 | Spurlock et al. |
| 2005/0098959 | A1 | | 5/2005 | Uhrner |

(Continued)

OTHER PUBLICATIONS

International Search Report and Written Opinion of PCT/US2018/055776 dated Feb. 15, 2019, 12 pages.

(Continued)

*Primary Examiner* — Jason L Vaughan
*Assistant Examiner* — Amanda Kreiling
(74) *Attorney, Agent, or Firm* — Lathrop GPM LLP

(57) ABSTRACT

A roll-forming manufacturing method of a roller bearing seal case includes (a) roll-forming, from a cylindrical ring, a first profiled ring having a first section extending along cylinder axis of the cylindrical ring and a second section extending from the first section inward toward the cylinder axis, (b) applying outward pressure to the first section, in direction away from the cylinder axis, to round the first section, and (c) roll-forming a second profiled ring from the first profiled ring.

10 Claims, 14 Drawing Sheets

(56) References Cited

U.S. PATENT DOCUMENTS

2012/0317814 A1* 12/2012 Spurlock ............. B21C 37/0811
  29/898.11
2015/0110431 A1   4/2015 Engstrom et al.
2017/0082201 A1   3/2017 Thomas

OTHER PUBLICATIONS

Chinese Patent Application No. 201880066959, First Office Action dated May 28, 2021, with English translation, 18 pages.
European Patent Application No. 18866303.3, extended European search report dated Mar. 23, 2021, 8 pages.

* cited by examiner

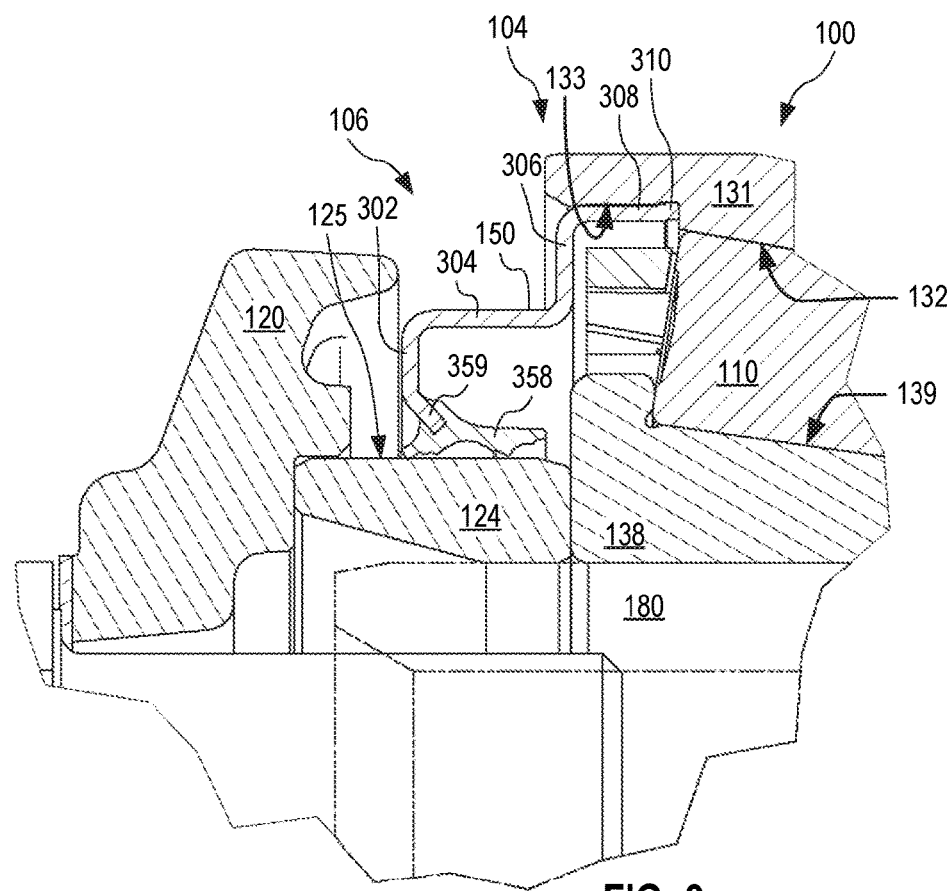
FIG. 3
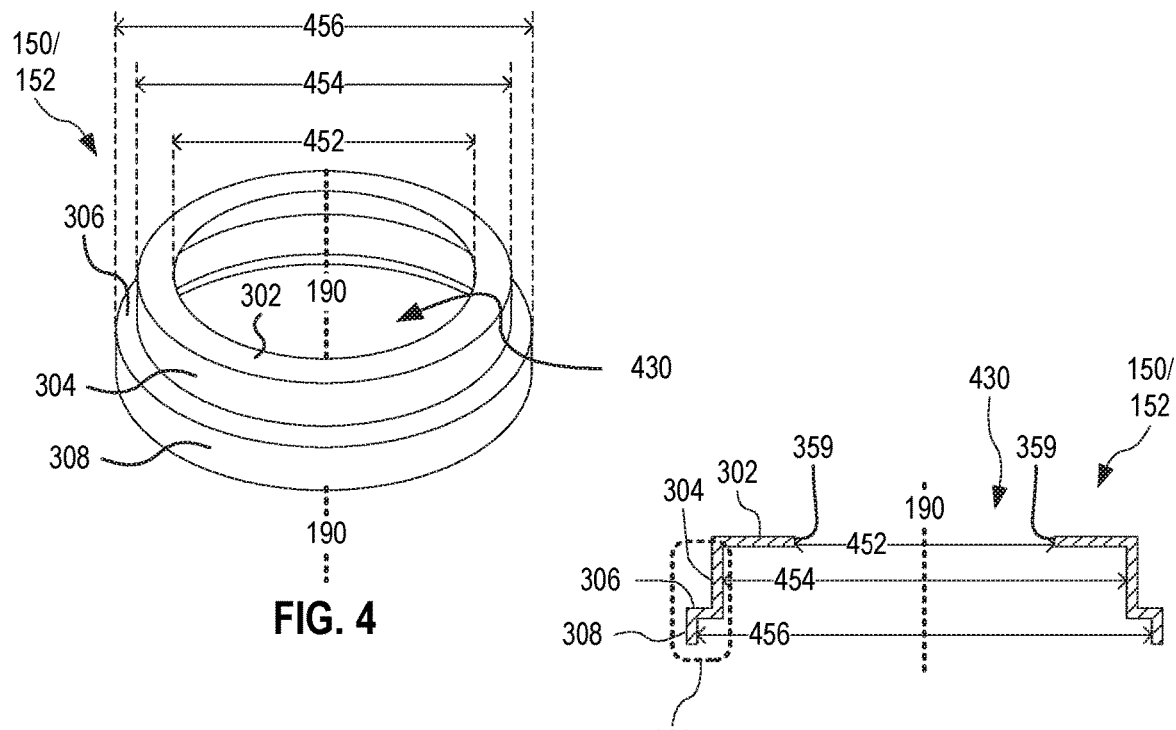
FIG. 4
FIG. 5

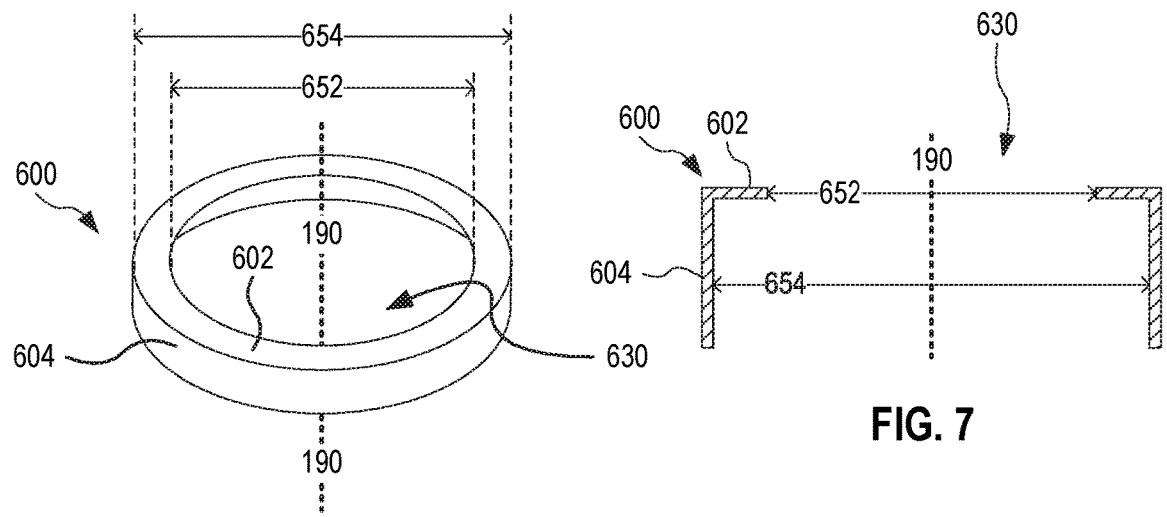
FIG. 6
FIG. 7
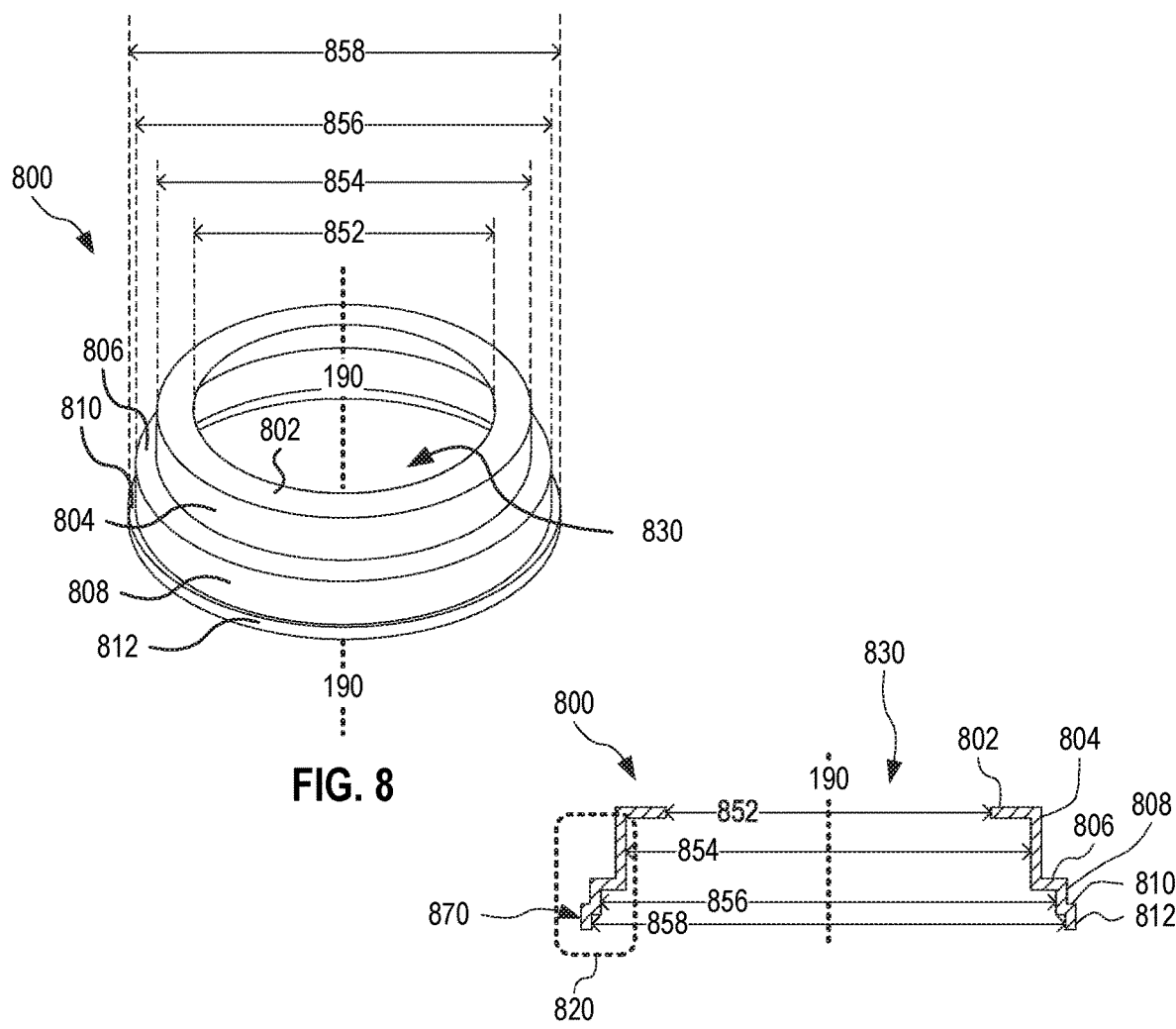
FIG. 8
FIG. 9

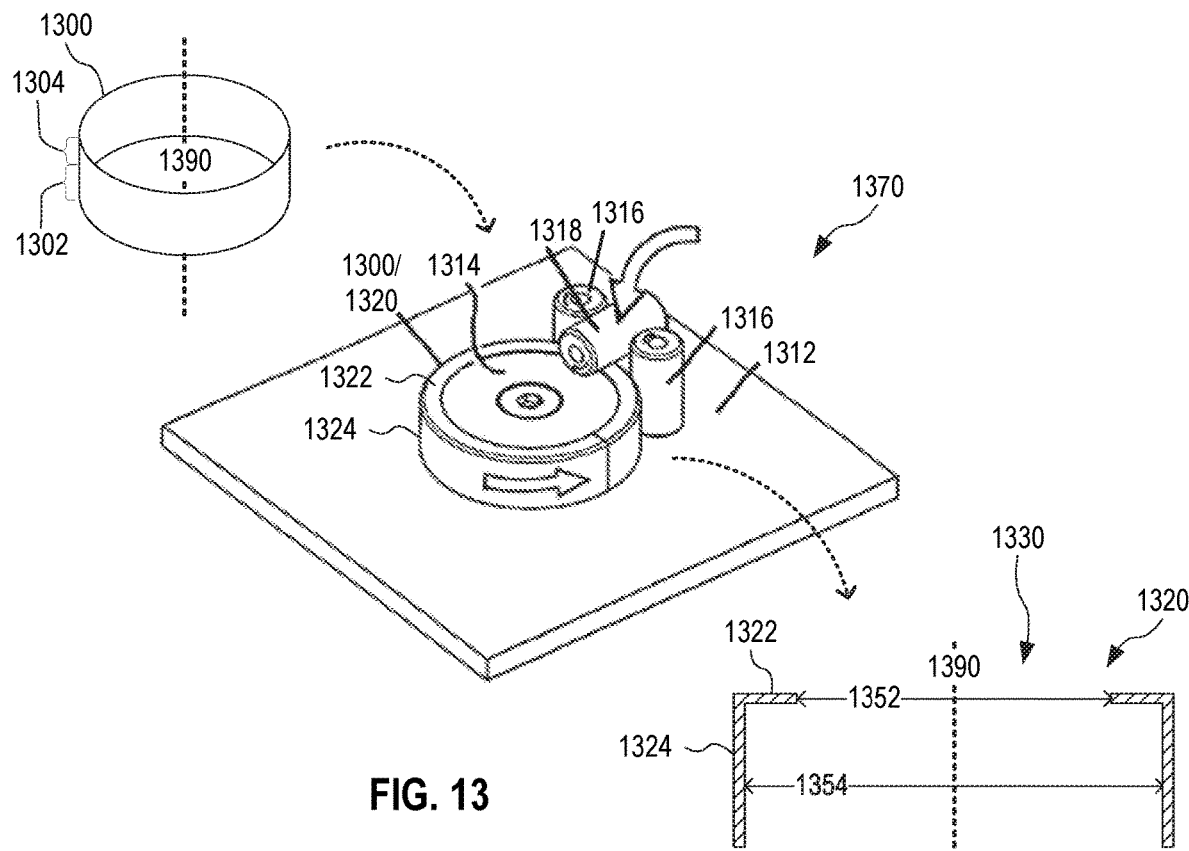
FIG. 13
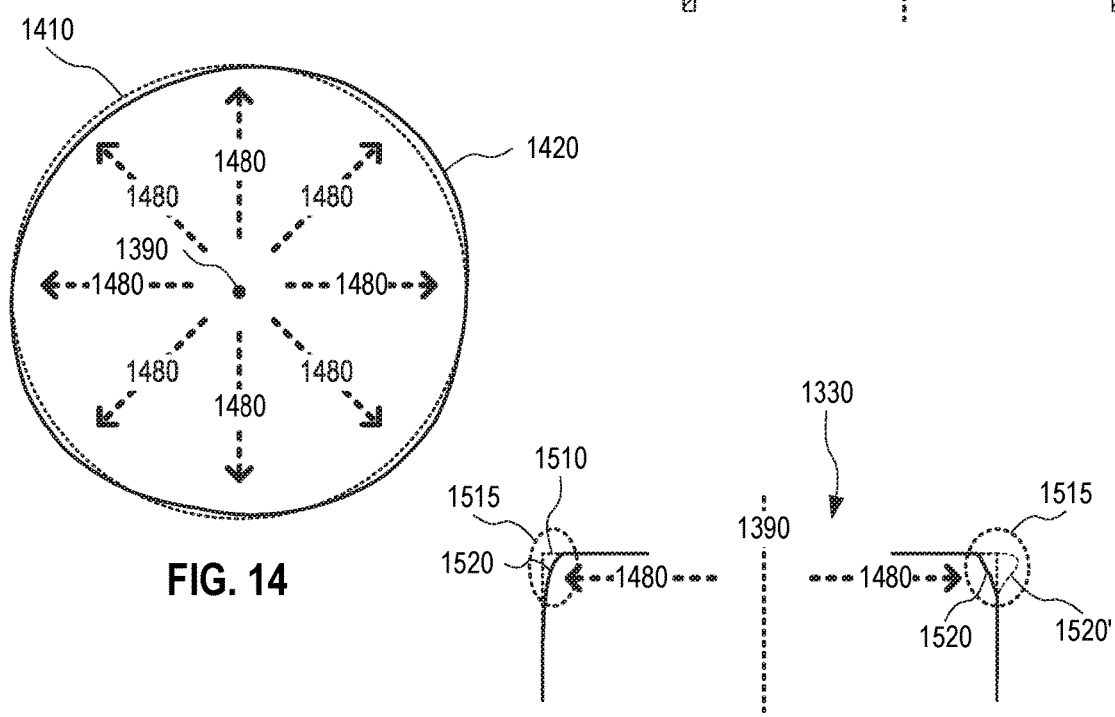
FIG. 14
FIG. 15

US 11,253,907 B2

ROLL-FORMING METHODS FOR MANUFACTURING ROLLER BEARING SEAL CASE

CROSS-REFERENCE TO RELATED APPLICATIONS

The present application is a divisional of U.S. patent application Ser. No. 15/784,101, filed Oct. 14, 2017, which is incorporated herein by reference in its entirety.

BACKGROUND

Tapered roller bearings on railcar axles support operating loads capable of producing deflections in the axle, and in particular, the end portion of the axle comprising the journal on which the tapered roller bearing is affixed. The stresses imposed by the operating loads are particularly high in the journal portion of the shaft at or near the backing ring.

As result of shaft deflections, the backing ring and the journal often experience fretting wear as the backing ring moves relative to the journal. Fretting wear may be sufficient to loosen the backing ring, increasing the axial play of the bearing on the journal. The loose backing ring accelerates wear on the bearing assembly and journal, potentially leading to shaft or bearing failure.

Through use of a bearing seal, the bearing attempts to retain lubricants in the form of oils or grease while also excluding external water and abrasives. The bearing seal is a ring shaped structure that usually includes a resilient seal member.

BRIEF DESCRIPTION OF THE DRAWINGS

FIGS. 1, 2, and 3 illustrate a tapered roller bearing assembly having two exemplary seal cases that may be manufactured according to roll-forming methods disclosed herein, according to an embodiment.

FIGS. 4 and 5 illustrate, in perspective view and schematic cross-sectional view, respectively a seal case of the embodiment illustrated in FIGS. 1, 2, and 3.

FIGS. 6 and 7 illustrate an embodiment of another seal case that may be manufactured according to the roll-forming methods disclosed herein.

FIGS. 8 and 9 illustrate one seal case manufactured according to the roll-forming methods disclosed herein and having three steps in diameter, according to an embodiment.

FIG. 13 illustrates an example of a roll-forming step of the method of FIG. 12.

FIG. 14 illustrates one exemplary effect of radially outward pressure applied in the method of FIG. 12.

FIG. 15 illustrates another exemplary effect of radially outward pressure applied in the method of FIG. 12.

DETAILED DESCRIPTION OF THE EMBODIMENTS

Disclosed herein are methods of manufacturing a roller bearing seal case. These manufacturing methods may be used to manufacture roller bearing seal cases for implementation in a variety of roller bearing types. For example, the methods may be used to manufacture a roller bearing seal case for use in a tapered roller bearing seal case on a railway freight car axle or a heavy-duty truck. More generally, the methods may be used to manufacture roller bearing seal cases for implementation in a roller bearing or ball bearing requiring a lubricant.

The methods disclosed herein provide improvements over conventional methods especially in regards to material use. The conventional methods usually involve stamping a round shape out of a metal sheet, resulting in a significant amount of scrap. In contrast, the presently disclosed methods utilize roll-forming to minimize material waste. These roll-forming methods are further adapted to form the roller bearing seal cases with improved roundness and accuracy.

Figure 1:
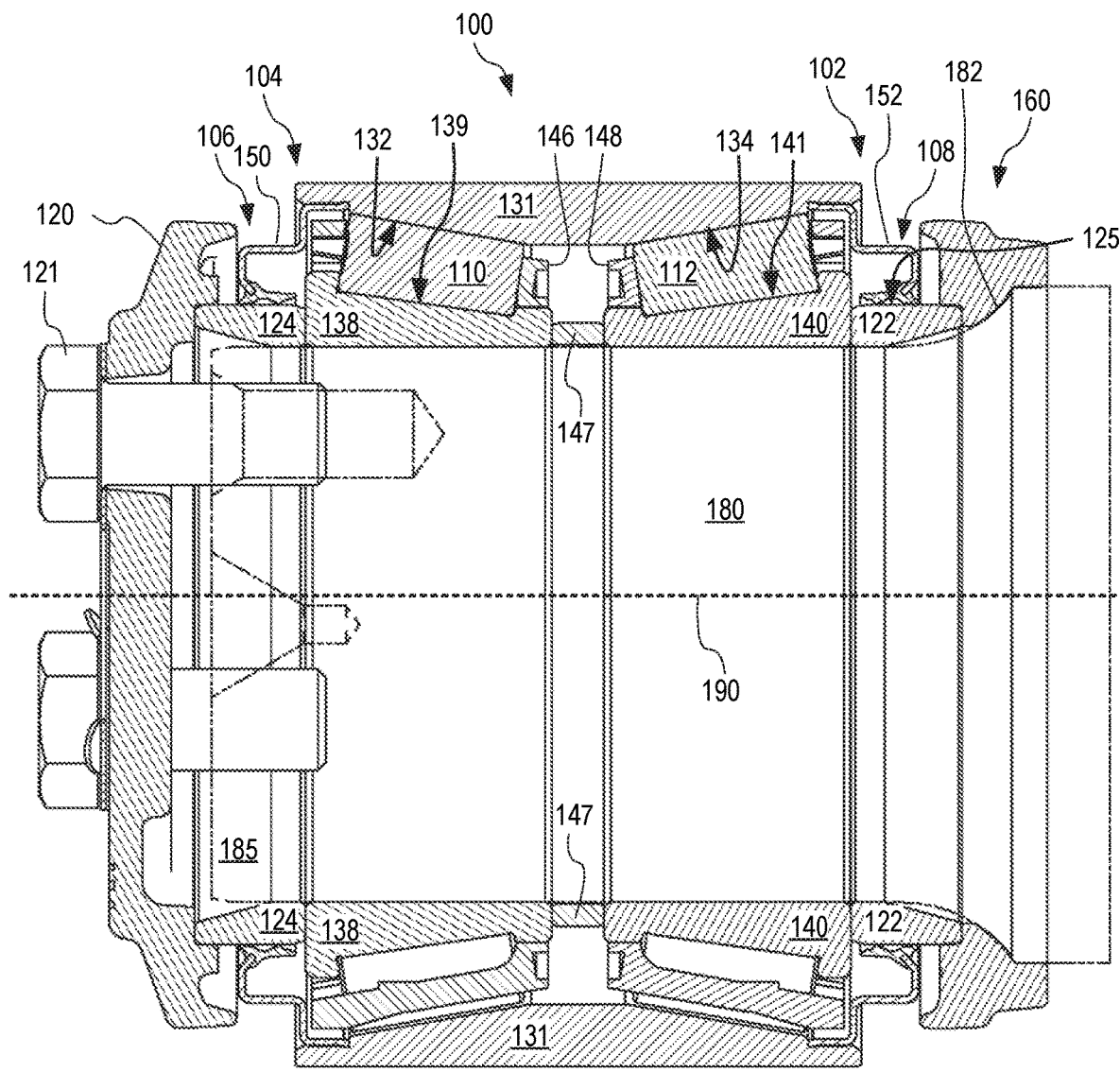
Figure 2:
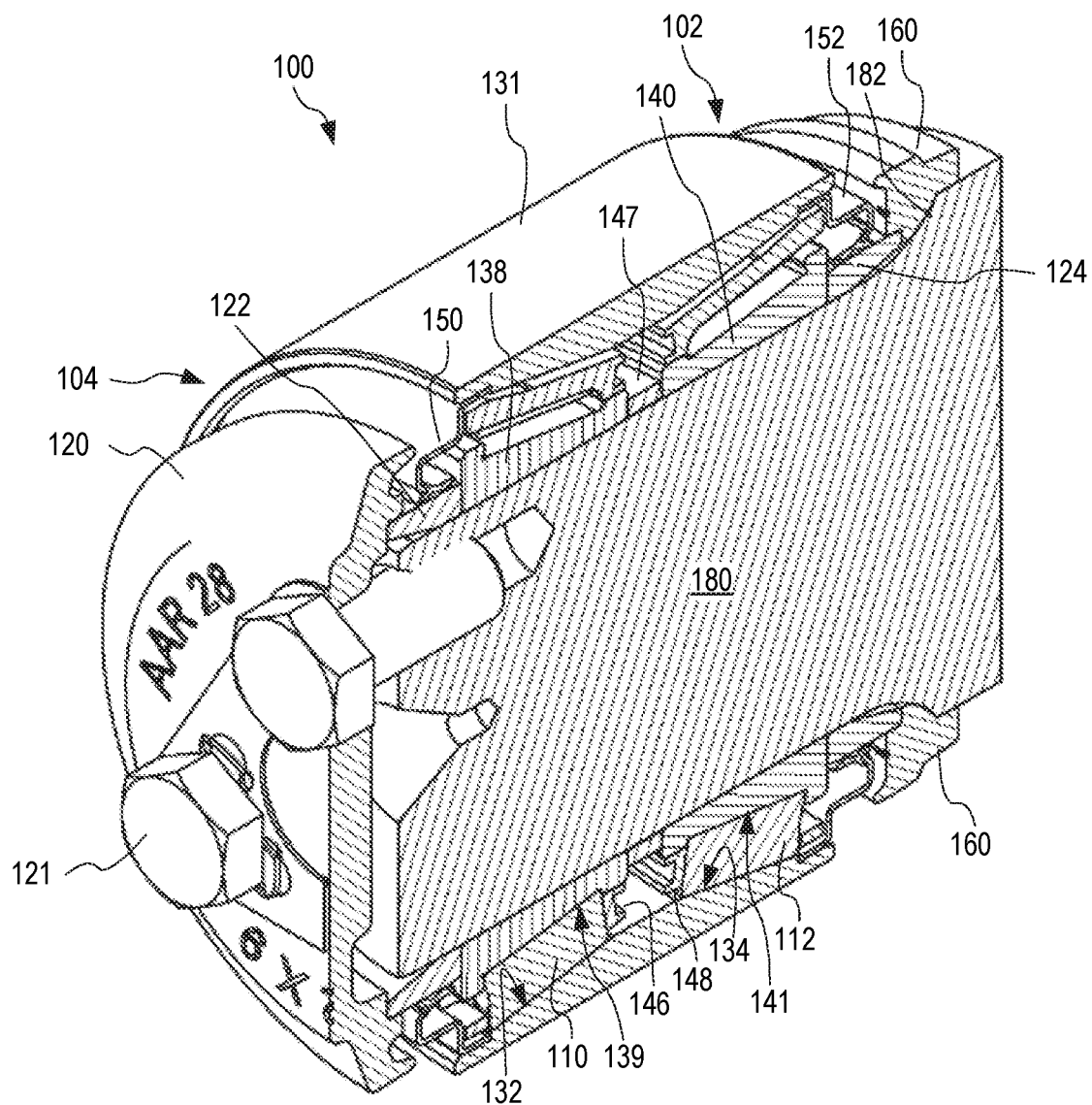

FIGS. 1, 2, and 3 illustrate one tapered roller bearing assembly 100 having two exemplary seal cases 150 and 152 that may be manufactured according to the roll-forming methods disclosed herein. Tapered roller bearing assembly 100 is of the type commonly used in railway applications to support a railcar wheel on an axle, and FIGS. 1 and 2 show tapered roller bearing assembly 100 mounted on a journal 180 of an axle of a railcar. FIG. 1 shows a full section view of tapered roller bearing assembly 100 mounted on journal 180, with the section being taken along the rotation axis 190 of journal 180. FIG. 2 is a pictorial section view of tapered roller bearing assembly 100, also with the section being taken along rotation axis 190 of journal 180. FIG. 3 is a close-up of an upper left-hand portion of the full section view of FIG. 1. FIGS. 1-3 are best viewed together in the following description.

Tapered roller bearing assembly 100 is typically preassembled before being mounted on the axle. At each free end of the axle, journal 180 terminates in a slightly conical tapered section 185 to facilitate installation of tapered roller bearing assembly 100 onto journal 180. Tapered roller bearing assembly 100 is pressed onto journal 180 to establish an interference fit.

In some embodiments, tapered roller bearing assembly 100 has wear rings 122 and 124 fitted over journal 180 at each end of tapered roller bearing assembly 100. Wear rings 122 and 124 typically have an inner diameter dimension providing an interference fit with journal 180 over at least a portion of their length. Wear rings 122 and 124 rotate with journal 180 as it turns. Wear rings 122 and 124 protect journal 180 against rubbing wear from the tapered roller bearing assembly 100 by providing a wear surface.

Although tapered roller bearing assembly 100 is pressed onto journal 180, further restraint is generally required against axial loads. Herein, "axial" refers to directions that are generally along rotation axis 190, and "radial" refers to directions that are generally orthogonal to rotation axis 190. To provide the axial restraint, tapered roller bearing assembly 100 is captured between a backing ring assembly 160 at the inboard end 102 of tapered roller bearing assembly 100 and a bearing retaining cap 120 at the outboard end 104 of tapered roller bearing assembly 100.

A shoulder 182 of journal 180 prohibits axially inward displacement of backing ring assembly 160, such that backing ring assembly 160 restrains tapered roller bearing assembly 100 against axially inward displacement. At outboard end 104 of journal 180, tapered roller bearing assembly 100 is captured by bearing retaining cap 120 through the interposed and abutting outboard wear ring 124. Bearing retaining cap 120 is affixed to the free end of journal 180 with cap screws or bolts 121 threaded into journal 180. Bearing retaining cap 120 completes the mounting of tapered roller bearing assembly 100 onto journal 180, and provides a clamping force to restrain tapered roller bearing assembly 100 against axially outward displacement.

Tapered roller bearing assembly 100 is preassembled from a number of individual components, including two cylindrical bearing cones 138 and 140 and a cylindrical bearing cup 131. Bearing cup 131 forms radially-inward-directed outer raceways 132 and 134. Bearing cones 138 and 140 have radially-outward-directed inner raceways 139 and 141, respectively. A center spacer 147 is positioned between bearing cones 138 and 140 to accurately position and maintain bearing cones 138 and 140 in place relative to each other and to allow for proper bearing lateral clearance. Outer raceway 132 of bearing cup 131 cooperates with inner raceway 139 of bearing cone 138 to capture and support a row of tapered rollers 110. The row of tapered rollers 110 encircles journal 180. Similarly, outer raceway 134 of bearing cup 131 cooperates with inner raceway 141 of bearing cone 140 to capture and support a row of tapered rollers 112. The row of tapered rollers 112 encircles journal 180. In some embodiments, cages 146 and 148 maintain the circumferential spatial positioning of tapered rollers 110 and 112 around journal 180.

Bearing seals 106 and 108 cover the outboard and inboard ends, respectively, of tapered roller bearing assembly 100 to minimize (a) lubricant leakage from tapered roller bearing assembly 100 and (b) intrusion of contaminants, such as water or abrasives, into tapered roller bearing assembly 100. Bearing seals 106 and 108 form a dynamic seal between stationary and moving bearing assembly components. Bearing seal 106 includes seal case 150, and bearing seal 108 includes seal case 152. Each of seal cases 150 and 152 encircles journal 180, is generally ring-shaped, and is typically made of steel. Bearing seals 106 and 108 (a) affix to stationary (i.e., non-rotating) side of tapered roller bearing assembly 100 (such as bearing cup 131) by interference fit or other method, and (b) are the sealed against wear rings 124 and 122, respectively, to seal tapered roller bearing assembly 100. Bearing seals 106 and 108 may be identical or similar to each other. In one embodiment, each of seal case 150 and seal case 152 includes a first radial edge 310 (as shown in FIG. 3 for seal case 150) that extends radially outward and fits against an inner radial surface 133 of bearing cup 131. A second radial edge 359 (shown in FIG. 3 for seal case 150) of each of seal cases 150 and 152 extends radially inward and has a resilient seal 358 attached thereto. Resilient seal 358 contacts outer radial surface 125 of the associated wear ring (wear ring 124 for seal case 150, and wear ring 122 for seal case 152) and is typically made of a rubber or synthetic flexible material.

FIGS. 4 and 5 show seal case 150 (or 152) in perspective view and schematic cross-sectional view, respectively. The cross section in FIG. 5 coincides with rotation axis 190. FIGS. 4 and 5 are best viewed together in the following description. Seal case 150 is formed from a single piece of material, for example steel. Seal case 150 includes radial section 302 and a side section 320 connected therewith. At its radially inward perimeter, radial section 302 terminates in radial edge 359 defining an aperture 430. Side section 320 includes an axial section 304, a radial section 306, and an axial section 308. Herein, a "radial section" refers to a section that extends toward or away from rotation axis 190, and an "axial section" refers to a section that extends along rotation axis 190. Aperture 430 has diameter 452. Axial section 304 has inner diameter 454, and axial section 308 has inner diameter 456. Inner diameter 454 is greater than diameter 452, and inner diameter 456 is greater than inner diameter 454. Without departing from the scope hereof, seal case 150 may further include radial edge 310 (FIG. 3) at the end of axial section 308 furthest from radial section 302.

FIGS. 6 and 7 illustrate another seal case 600 that may be manufactured according to the roll-forming methods disclosed herein. FIGS. 6 and 7 show seal case 600 in perspective view and cross-sectional view, respectively. The cross section in FIG. 7 coincides with rotation axis 190. FIGS. 6 and 7 are best viewed together in the following description. Seal case 600 may be used to seal tapered roller bearing assembly 100 in place of each of seal cases 150 and 152.

Seal case 600 is formed from a single piece of material, for example steel, and includes a radial section 602 and an axial section 604. Radial section 602 is similar to radial section 302. The inner perimeter of radial section 602 defines an aperture 630 having diameter 652. Axial section 604 is a simplified version of side section 320. Axial section 604 has inner diameter 654 which is greater than diameter 652.

Although FIGS. 6 and 7 show radial section 602 as being perpendicular to rotation axis 190, radial section 602 may be at an oblique angle to rotation axis 190 without departing from the scope hereof. Likewise, axial section 604 may be at an oblique angle to rotation axis 190 without departing from the scope hereof.

FIGS. 8 and 9 illustrate a seal case 800 having three steps in diameter. Seal case 800 may be manufactured according to the roll-forming methods disclosed herein. FIGS. 8 and 9 show seal case 800 in perspective view and cross-sectional view, respectively. The cross section in FIG. 9 coincides with rotation axis 190. FIGS. 8 and 9 are best viewed together in the following description. Seal case 600 may be used to seal tapered roller bearing assembly 100 in place of each of seal cases 150 and 152.

Seal case 800 includes a radial section 802 and a stepped-diameter section 820. Seal case 800 is similar to seal case 600 except for replacing radial section 602 with radial section 802 and replacing axial section 604 with section 820. Radial section 802 is similar to radial section 602 and defines an aperture 830 with diameter 852. Section 820 includes an axial section 804, a radial section 806, an axial section 808, a radial section 810, and an axial section 812. Axial section 804 has inner diameter 854 which is greater than diameter 852. Axial section 808 has inner diameter 856 which is greater than inner diameter 854. Axial section 812 has inner diameter 858 which is greater than inner diameter 856. Axial section 812 may be used to affix seal case 800 in a bearing cup, such as bearing cup 131 (FIG. 1), in a manner similar to that of radial edge 310.

Although FIGS. 8 and 9 show radial sections 802, 806, and 810 as being perpendicular to rotation axis 190, one or more of radial sections 802, 806, and 810 may be at an oblique angle to rotation axis 190 without departing from the scope hereof. Likewise, one or more of axial sections 804, 808, 812 may be at an oblique angle to rotation axis 190 without departing from the scope hereof.

Figure 10:
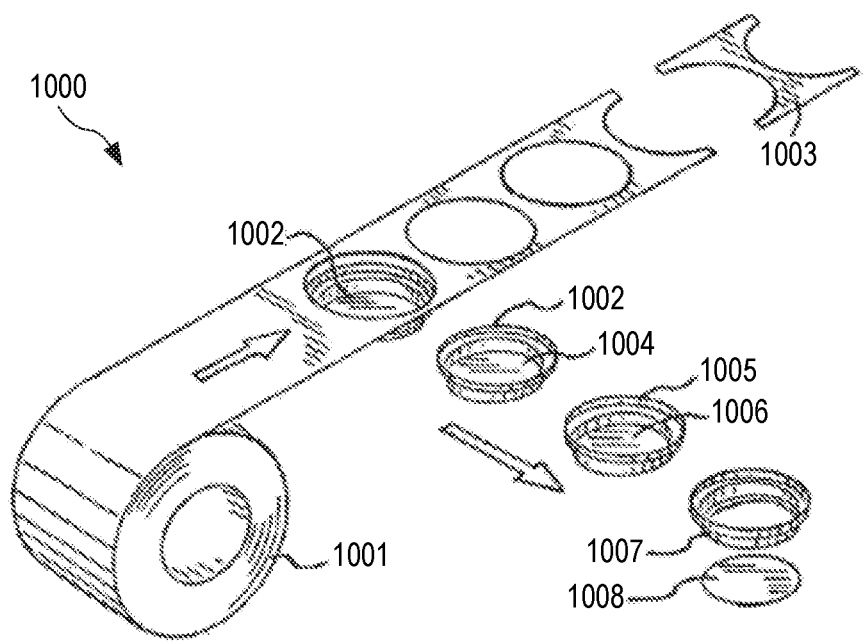
FIGS. 10 and 11 illustrate a conventional drawing process for manufacturing a seal case.
Figure 11:
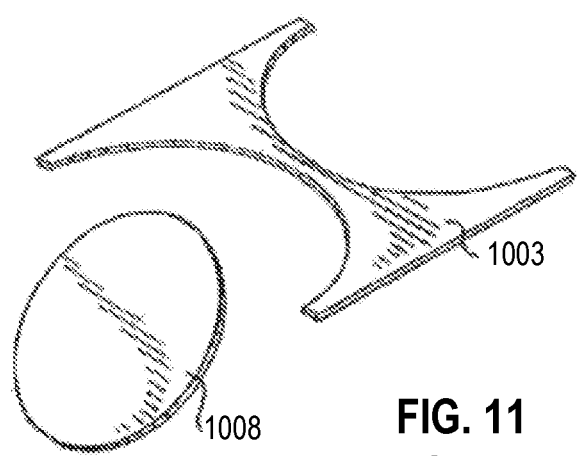

FIGS. 10 and 11 illustrate a conventional drawing process 1000 for manufacturing a seal case 1007 similar to seal case 150,152. FIGS. 10 and 11 are best viewed together in the following description. Drawing process 1000 stamps the seal case from a flat rolled coil of steel 1001. It is noted that the width of the flat rolled coil of steel 1001 is wider than the diameter of the material needed to form the final bearing seal case 1007. Drawing process 1000 manufactures seal case 1007 through a progressive die stamping operation. These progressive operations are generally shown in FIG. 10. A first stamping operation forms a pre-form seal case 1002 having a centrally located component 1004. In a second stamping operation, component 1004 is restruck, and pre-form seal case 1002 is given an initial start of its final geometry to form a seal case 1005 having a centrally located component 1006. In a third stamping operation, component 1006 is cut and pressed back into seal case 1005, and seal case 1005 is coined to its final form. In a final operation, component 1006 is removed, leaving behind a seal case 1007.

The ultimate amount of waste product (see FIG. 11) from this convention drawing process is center component 1008 and a leftover portion 1003 of coil of steel 1001.

Figure 12:
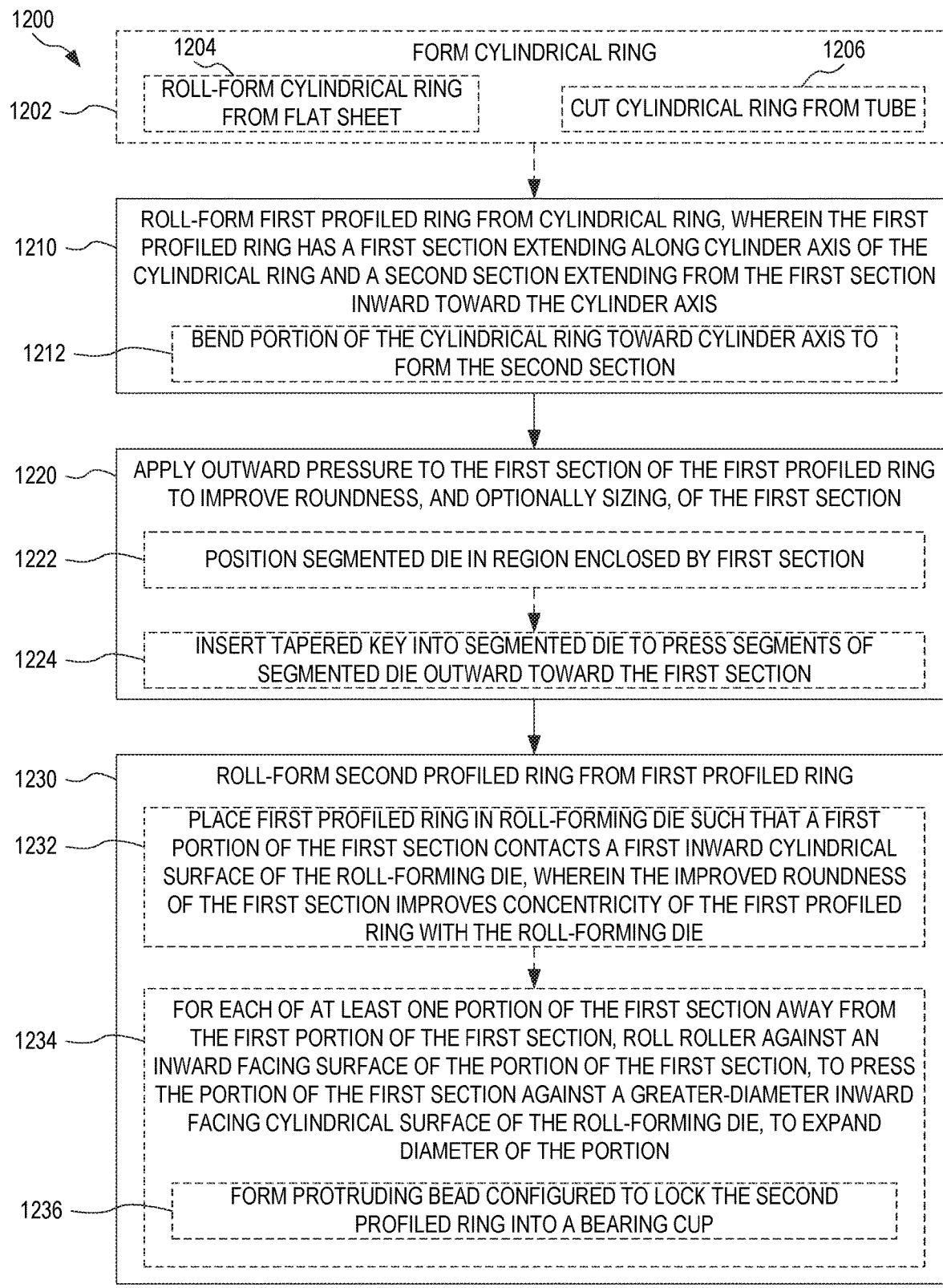
FIG. 12 illustrates a roll-forming method for manufacturing a seal case, which includes an intermediate step of improving roundness of the workpiece, according to an embodiment.

FIG. 12 illustrates one roll-forming method 1200 for manufacturing a seal case, which includes an intermediate step of improving roundness of the workpiece. Method 1200 is, for example, used to manufacture any one of seal cases 108, 600, and 800. Method 1200 applies roll-forming to better utilize the input material, so as to reduce waste as compared to drawing process 1000. Method 1200 may form the seal case from metal, such as steel.

In one embodiment, method 1200 initiates with receiving a cylindrical ring and applying a roll-forming step 1210 to the cylindrical ring. In another embodiment, method 1200 first forms the cylindrical ring in a step 1202 before proceeding to roll-forming step 1210. Step 1202 may form the cylindrical ring without generating waste. In one embodiment, step 1202 includes a step 1204 of roll-forming the cylindrical ring from a rectangular strip, for example a flat rectangular strip of steel. The strip is roll-formed to join opposite ends of the strip, so as to form a cylindrical ring. The ends may be joined by welding. In another embodiment, step 1202 includes a step 1206 of cutting the cylindrical ring from a tube. Both step 1204 and step 1206 may be performed without generating waste.

In a step 1210, method 1200 roll-forms a first profiled ring from a cylindrical ring. The first profiled ring has an axial section extending along the cylinder axis of the cylindrical ring and a radial section extending from the first section inward toward the cylinder axis. Step 1210 may include a step 1212 of forming the radial section by bending a portion of the cylindrical ring toward the cylinder axis.

FIG. 13 illustrates an example of step 1210 implementing step 1212 to roll-form a profiled ring 1320 from a cylindrical ring 1300. In this example of step 1210, cylindrical ring 1300 is placed in a roll-forming station 1370. Roll-forming station 1370 is configured to roll-form profiled ring 1320 from cylindrical ring 1300. Roll-forming station 1370 includes a die 1314 mounted on a base 1312. Roll-forming station 1370 further includes rollers 1316 and 1318. Rollers 1316 are orthogonal to base 1312, and roller 1318 is parallel to base 1312. Rollers 1316 and 1318 cooperate with die 1314 to bend a portion 1304 of cylindrical ring 1300 inward toward the cylinder axis 1390 of cylindrical ring 1300, to form a radial section 1322 from portion 1304 while a remaining portion 1302 of cylindrical ring 1300 is maintained as an axial section 1324, thereby forming profiled ring 1320. Radial section 1322 defines an aperture 1330 having diameter 1352. Axial section 1324 has an inner diameter 1354 which is greater than diameter 1352.

Without departing from the scope hereof, roller 1318 may be at an oblique angle to base 1312 to form radial section 1322 at an oblique angle to cylinder axis 1390.

Referring again to FIG. 12, method 1200 further includes a step 1220 applying radially outward pressure to the axial section of the first profiled ring, formed in step 1210, to improve roundness of the axial section. Step 1220 may additionally serve to adjust the sizing of the axial section to more accurately achieve a desired size thereof.

FIG. 14 illustrates one exemplary effect of the radially outward pressure applied in step 1220. In this example, an axial section (for example, axial section 1324) has an initially non-cylindrical cross section 1420. Radially outward pressure 1480 corrects cross section 1420 to achieve, or at least more closely approximate, a desired circular cross section 1410. Radially outward pressure 1480 is, for example, produced by an expandable die placed inside axial section 1324.

FIG. 15 illustrates another exemplary effect of the radially outward pressure 1480 applied in step 1220. In this example, an axial section (for example, axial section 1324) has a non-uniform profile 1520 along cylinder axis 1390. For example, the corner 1515 where a radial section (for example, radial section 1322) meets an axial section (for example, axial section 1324) may be less square than desired and/or have a varying degree of deviations from roundness. In the example depicted in FIG. 15, non-uniform profile 1520 has less defined corners. However, non-uniform profile 1520 may instead be bulging outwards, as indicated in the right-hand side of FIG. 15 by profile 1520'. Radially outward pressure 1480 corrects profile 1520 to achieve, or at least more closely approximate, a desired profile 1510, such as a profile 1510 with a more square corner between the radial and axial sections.

In another example, step 1220 achieves a combination of the effects shown in FIGS. 14 and 15. It is understood that radially outward pressure 1480 may further modify the sizing of the axial section (for example, axial section 1324) by expanding the diameter of the axial section.

Referring again to FIG. 12, step 1220 may include steps 1222 and 1224. Step 1222 positions a segmented die in a region enclosed by the axial section of the profiled ring formed in step 1210. Step 1224 inserts a tapered key into the segmented die to press segments of the segmented die radially outward toward the axial section.

Figure 16:
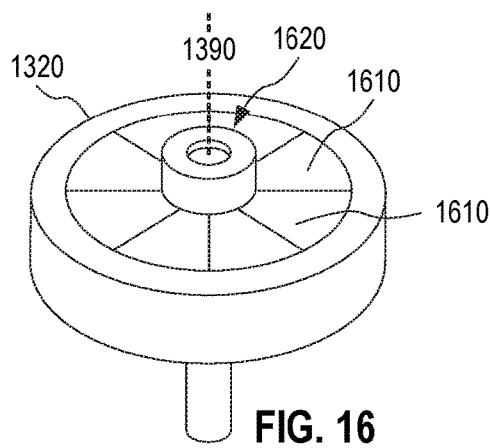
FIGS. 16 and 17 illustrate, in perspective view and cross-sectional view, respectively, an example of a step of the method of FIG. 12 to improve roundness, and optionally sizing, of a profiled ring.
Figure 17:
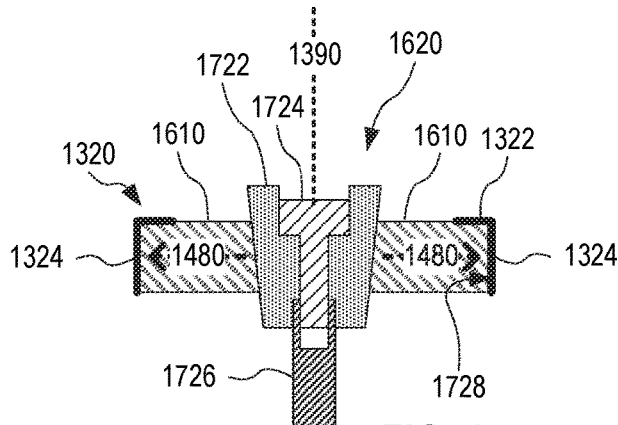

FIGS. 16 and 17 illustrate, in perspective view and cross-sectional view, respectively, one example of step 1220 that implements steps 1222 and 1224 to improve the roundness of profiled ring 1320. The example shown in FIGS. 16 and 17 may further modify the sizing of profiled ring 1320 as discussed above in reference to FIGS. 14 and 15. FIGS. 16 and 17 are best viewed together in the following description.

In the example of FIGS. 16 and 17, profiled ring 1320 is placed over a segmented die having a plurality of die segments 1610. For clarity of illustration, not all die segments 1610 are labeled in FIGS. 16 and 17. A tapered key 1620 is positioned in a central aperture of segments 1610. Tapered key 1620 includes a tapered, cannulated core 1722, a driver 1724, and a receptacle 1726. The interface between core 1722 and die segments 1610 is tapered, with the diameter of core 1722 increasing in the direction away from receptacle 1726. The axial position of receptacle 1726, along cylinder axis 1390, is fixed relative to die segments 1610. When driver 1724 is moved downward further into receptacle 1726 (for example by threading driver 1724 further into receptacle 1726), core 1722 is forced downward as well. This positions a greater-diameter portion of core 1722 at the interface with die segments 1610, thereby forcing die segments 1610 radially outward such that die segments 1610 apply radially outward pressure 1480 on a radially-inward-facing surface 1728 of axial section 1324.

Although not shown in FIGS. 16 and 17, die segments 1610 may be resting on a base to which receptacle 1726 is directly or indirectly fastened. Without departing from the scope hereof, die segments 1610 and tapered key 1620 may be oriented such that driver 1724 enters core 1722 from the side of die segments 1610 that is away from radial section 1322, as opposed to the side of die segments 1610 that is adjacent to radial section 1322 (as shown in FIG. 17).

Referring again to FIG. 12, method 1200 further includes a step 1230 of roll-forming a second profiled ring from the first profiled ring of step 1210. Step 1230 is performed after step 1220 and benefits from the improved roundness (and optionally improved sizing accuracy) achieved in step 1220. The improved roundness (and optionally sizing accuracy) improves the accuracy of the roll-forming of step 1230 by providing a better fit between the first profiled ring and elements used to roll-form the first profile ring.

In an embodiment, step 1230 includes steps 1232 and 1234. Step 1232 places the first profiled ring in a roll-forming die such that a first portion of the first section contacts a first inward cylindrical surface of the roll-forming die. The improved roundness of the first section improves concentricity of the first profiled ring with the roll-forming die.

For each of at least one second portion of the axial section (e.g., axial section 1324) away from the first portion of the axial section, step 1234 rolls a roller against an inward facing surface of the second portion of the first section, to press the second portion of the first section against a greater-diameter inward facing cylindrical surface of the roll-forming die, so as to expand the diameter of the second portion. For each such second portion of the axial section, step 1234 introduces a step in the diameter of the axial section. When configured to introduce more than one step in the diameter of the axial section, different rollers may be applied simultaneously or sequentially to introduce the respective steps simultaneously or sequentially.

Figure 18:
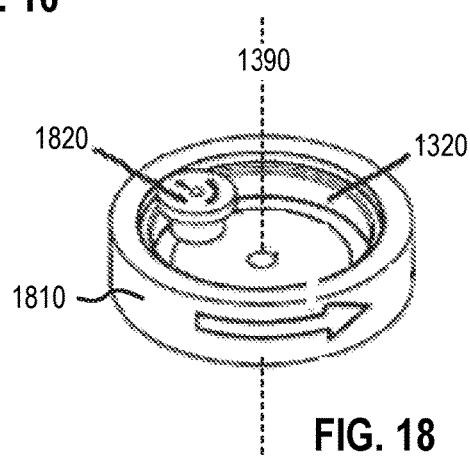
FIGS. 18, 19, and 20 illustrate an example of another roll-forming step of the method of FIG. 12.
Figure 19:
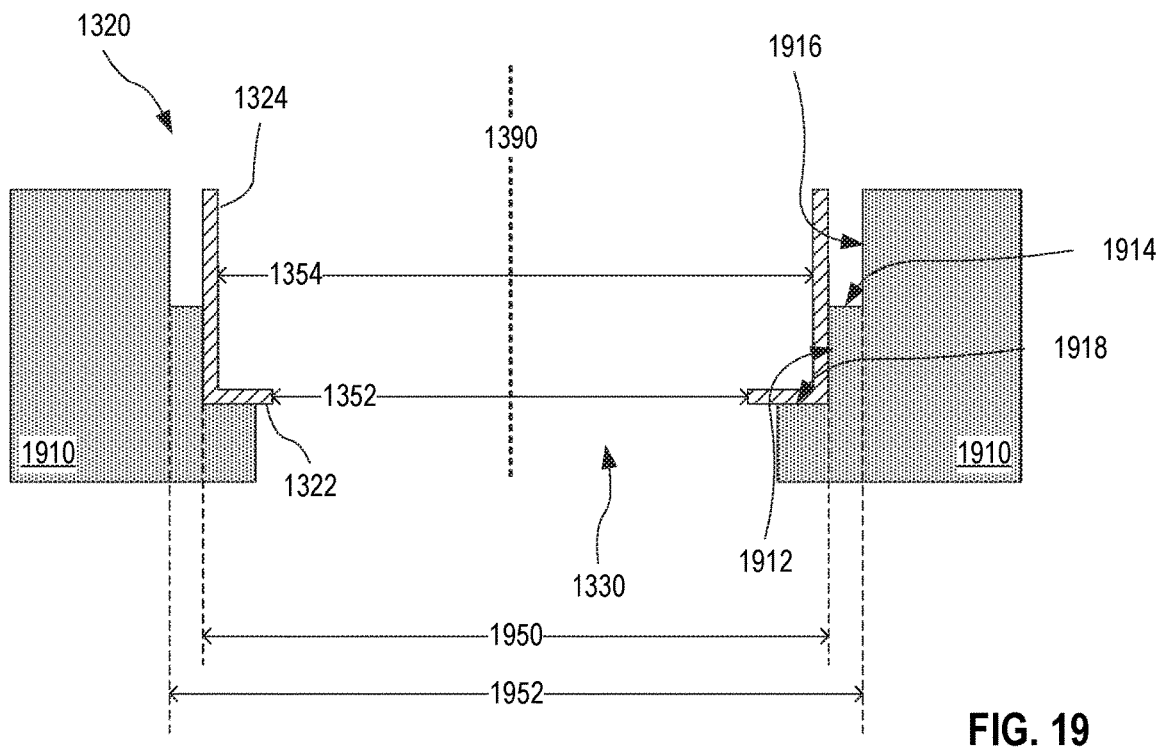
Figure 20:
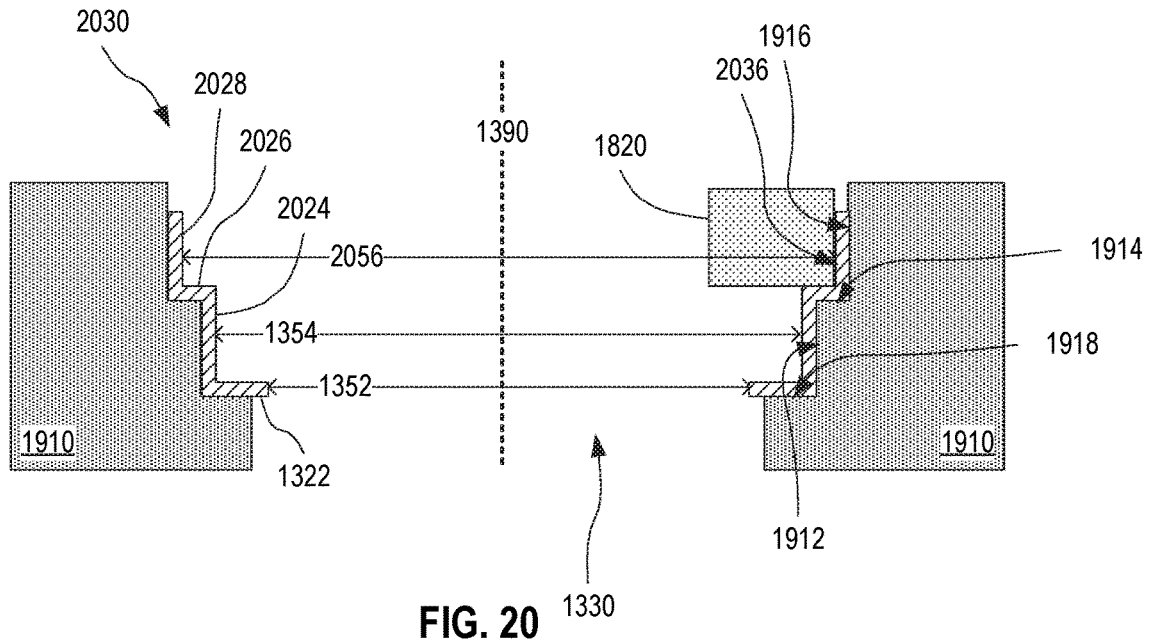

FIGS. 18-20 illustrate one example of step 1230, implementing steps 1232 and 1234, that introduces a single step in the diameter of axial section 1324 of profiled ring 1320 to produce a second profiled ring 2030. FIG. 18 provides a perspective view of this example of step 1230. FIG. 19 provide a cross-sectional view, respectively, of step 1232 of this example. FIG. 20 provides a cross-sectional view of step 1234 of this example. FIGS. 18-20 are best viewed together in the following description.

In this example of step 1232, profiled ring 1320 is placed in a die 1910. More specifically, radial section 1322 rests on a shelf 1918 of die 1910 with a portion of axial section 1324, closest to radial section 1322 fitted against a radially-inward-facing surface 1912 of die 1910. The improved roundness (and optionally sizing accuracy) of axial section 1324 achieved in step 1220 provides for improved concentricity of axial section 1324 and radially-inward-facing surface 1912, which in turn improves the accuracy of roll-forming operations performed in step 1230. The improved roundness (and optionally sizing accuracy) may also generally improve the tightness of the fit between axial section 1324 and radially-inward-facing surface 1912. Radially-inward-facing surface 1912 is adjacent shelf 1918. At a greater distance from shelf 1918, die 1910 forms another shelf 1914 that transitions radially-inward-facing surface 1912 to another radially-inward-facing surface 1916. The diameter 1952 of radially-inward-facing surface 1916 is greater than the diameter 1950 of radially-inward-facing surface 1912.

Next, in this example and as shown in FIGS. 18 and 20, a roller 1820 is rolled against a portion 2036 of the radially-inward-facing surface of axial section 1324 to press the associated portion of axial section 1324 against radially-inward-facing surface 1916 of die 1910. This results in the modification of axial section 1324 to a stepped diameter profile including an axial section 2024, adjacent radial section 1322, an axial section 2028 further from radial section 1322, and a radial section 2026 providing the transition between axial section 2024 and axial section 2028. Axial section 2024 has inner diameter 1354, and axial section 2028 has an inner diameter 2056 that is greater than inner diameter 1354.

Figure 21:
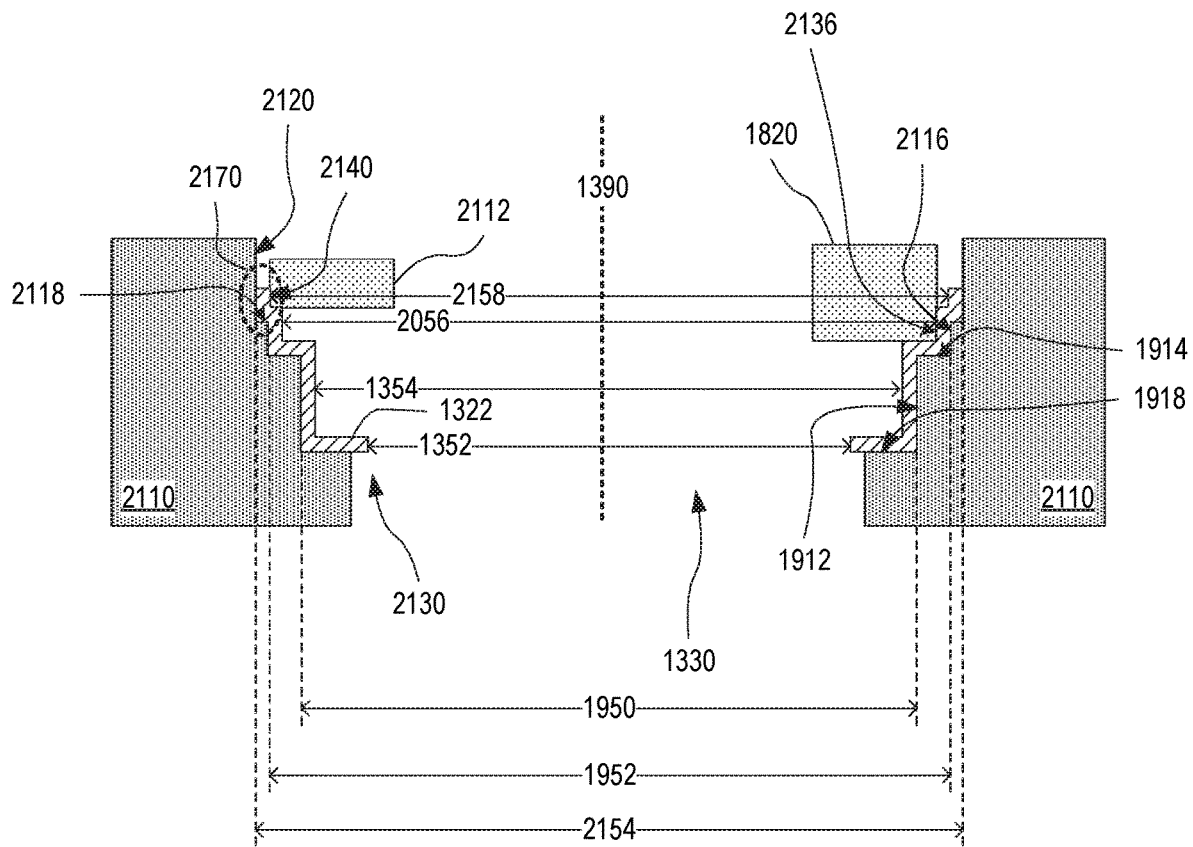
FIG. 21 illustrates a modification to the roll-forming step example of FIGS. 18-20.

FIG. 21 illustrates a modification to the FIGS. 18-20 example of step 1230, which forms two steps in the diameter of the axial section of profiled ring 1320 to produce a second profiled ring 2130. In this example of FIG. 21, profiled ring 1320 is placed in a die 2110. Die 2110 is similar to die 1910, except for having an additional step in diameter. As compared to die 1910, die 2110 replaces radially-inward-facing surface 1916 with a first radially-inward-facing surface 2136, adjacent to shelf 1914, a second inward radially-inward-facing surface 2120, and a shelf 2118 connecting radially-inward-facing surfaces 2126 and 2120.

In the example of FIG. 21, roller 1820 presses against a portion 2136 of the radially-inward-facing surface of axial section 1324 to press the associated portion of axial section 1324 against radially-inward-facing surface 2136. A second roller 2112 presses a portion 2140 of the radially-inward-facing surface of axial section 1324 to press the associated portion of axial section 1324 against radially-inward-facing surface 2120. This results in the modification of axial section 1324 to a double-stepped diameter profile that, as compared to second profiled ring 2030 forms an additional radially protruding bead 2170.

Referring again to FIG. 12, in an embodiment, step 1234 includes a step 2136 of forming a radially protruding bead configured to lock the second profiled ring into a bearing cup. For example, step 2136 forms radially protruding bead 2170.

Figure 22:
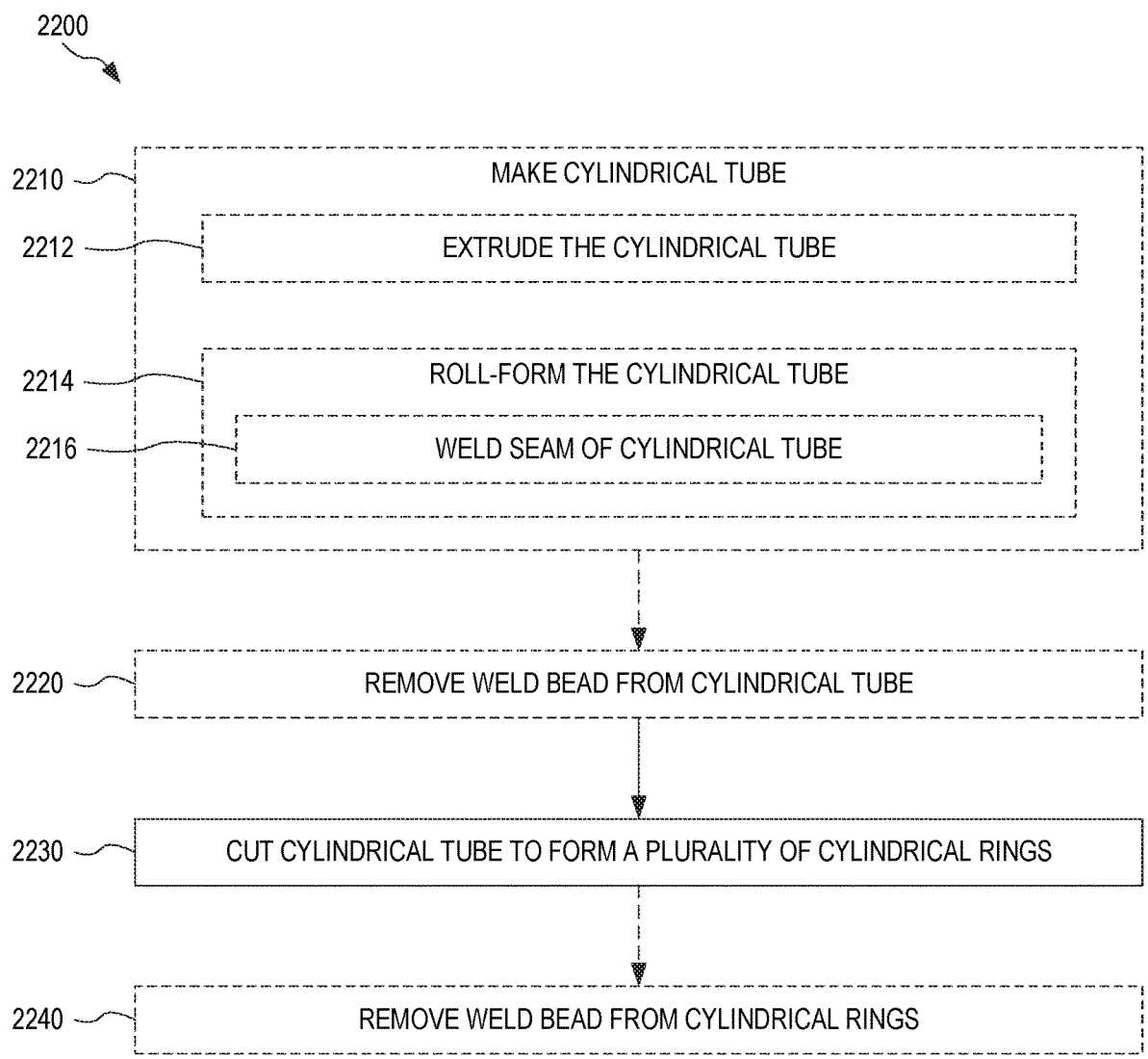
FIG. 22 illustrates a method for making a cylindrical ring by cutting a cylindrical tube, according to an embodiment.

FIG. 22 illustrates one exemplary method 2200 for making a cylindrical ring by cutting a cylindrical tube. Method 2200 avoids the production of waste products associated with drawing process 1000. The embodiment of step 1202 of method 1200 that includes step 1206 may implement method 2200.

In a step 2230, method 2200 cuts a cylindrical tube to form a plurality of cylindrical rings. In one example of step 2230, a metal cylinder is sliced to produce a plurality of cylindrical rings 1300. The metal cylinder may be made of steel. Step 2230 may utilize cutting methods known in the art.

Step 2230 may be preceded by a step 2210 of making the cylindrical tube. In one embodiment, step 2210 includes a step 2212 of extruding the cylindrical tube. In another embodiment, step 2210 includes a step 2214 of roll-forming the cylindrical tube. For example, step 2214 roll-forms a metal sheet into a tube. Step 2214 may include a step 2216 of welding the seam where two opposite edges of the sheet join each other to form the cylindrical tube.

Embodiments of method 2200 that include step 2210 may further include a step 2220 performed after step 2210 and prior to step 2230. Step 2220 removes the weld bead formed in step 2116, for example according to a process known in the art. Alternatively, embodiments of method 2200 that include step 2210 may include a step 2240, performed after step 2230, of removing the weld bead from each individual cylindrical ring formed in step 2230. Step 2240 may utilize a weld bead removal process known in the art.

After completion of method 2200, each cylindrical ring produced thereby may be processed by steps 1210, 1220, and 1230 of method 1200 to form a seal case.

Figure 23:
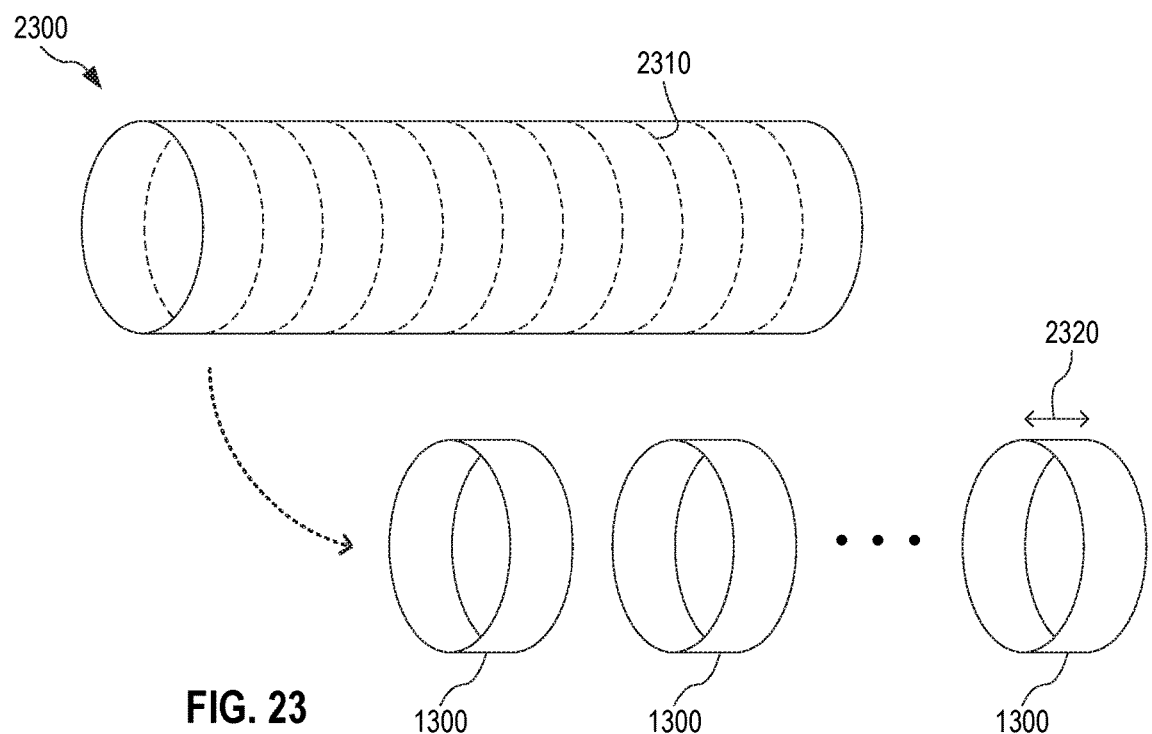
FIG. 23 illustrate an example of a cutting step of the method of FIG. 22.

FIG. 23 illustrates one example of step 2230 of method 2200. In this example, a cylindrical tube 2300 is cut along dicing lines 2310 to form a plurality of cylindrical rings 1300, each having an axial extent 2320. It is understood that manufacturing tolerances may cause some variation in axial extent 2320, both azimuthal variation of axial extent 2320 for an individual cylindrical ring 1300 and different axial extents 2320 for different cylindrical rings 1300.

Figure 24:
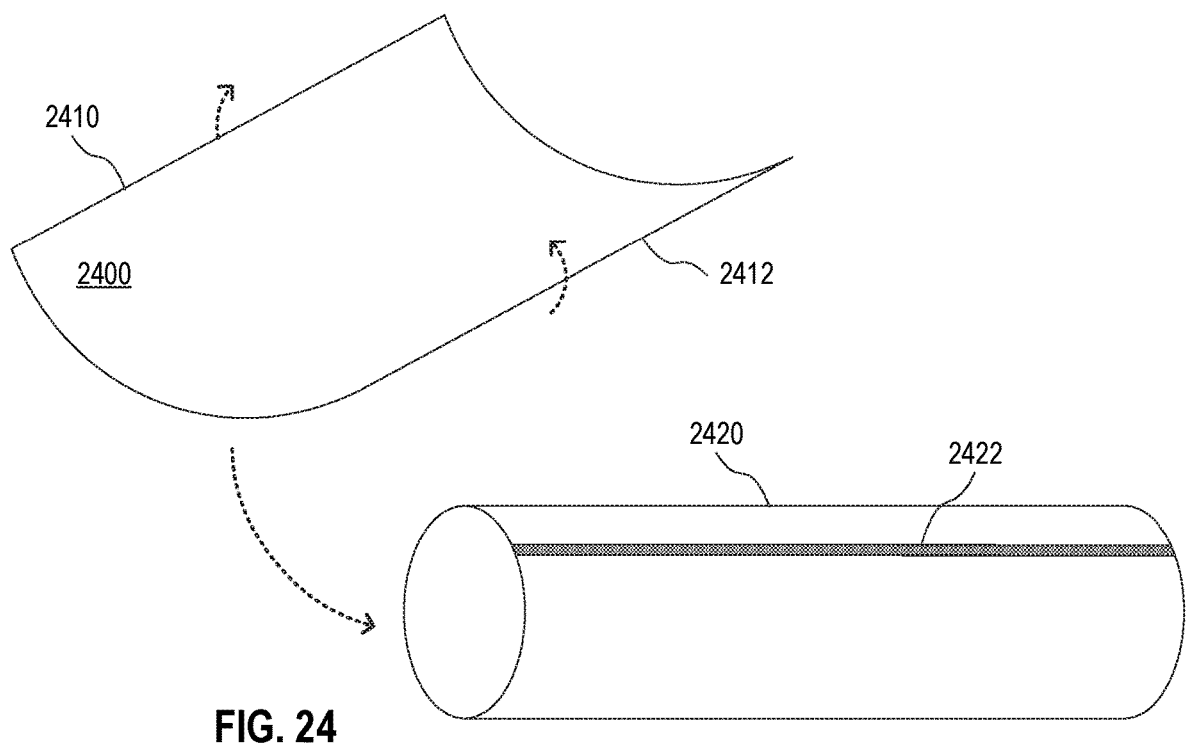
FIG. 24 illustrate an example of a roll-forming step of the method of FIG. 22.

FIG. 24 illustrates one example of step 2214 implementing step 2216. In this example, a sheet 2400 (for example a flat metal sheet) is roll-formed to join two opposite edges 2410 and 2412 to form a cylindrical tube 2420. The joint between edges 2410 and 2412 is welded, resulting in a weld bead 2422.

Figure 25:
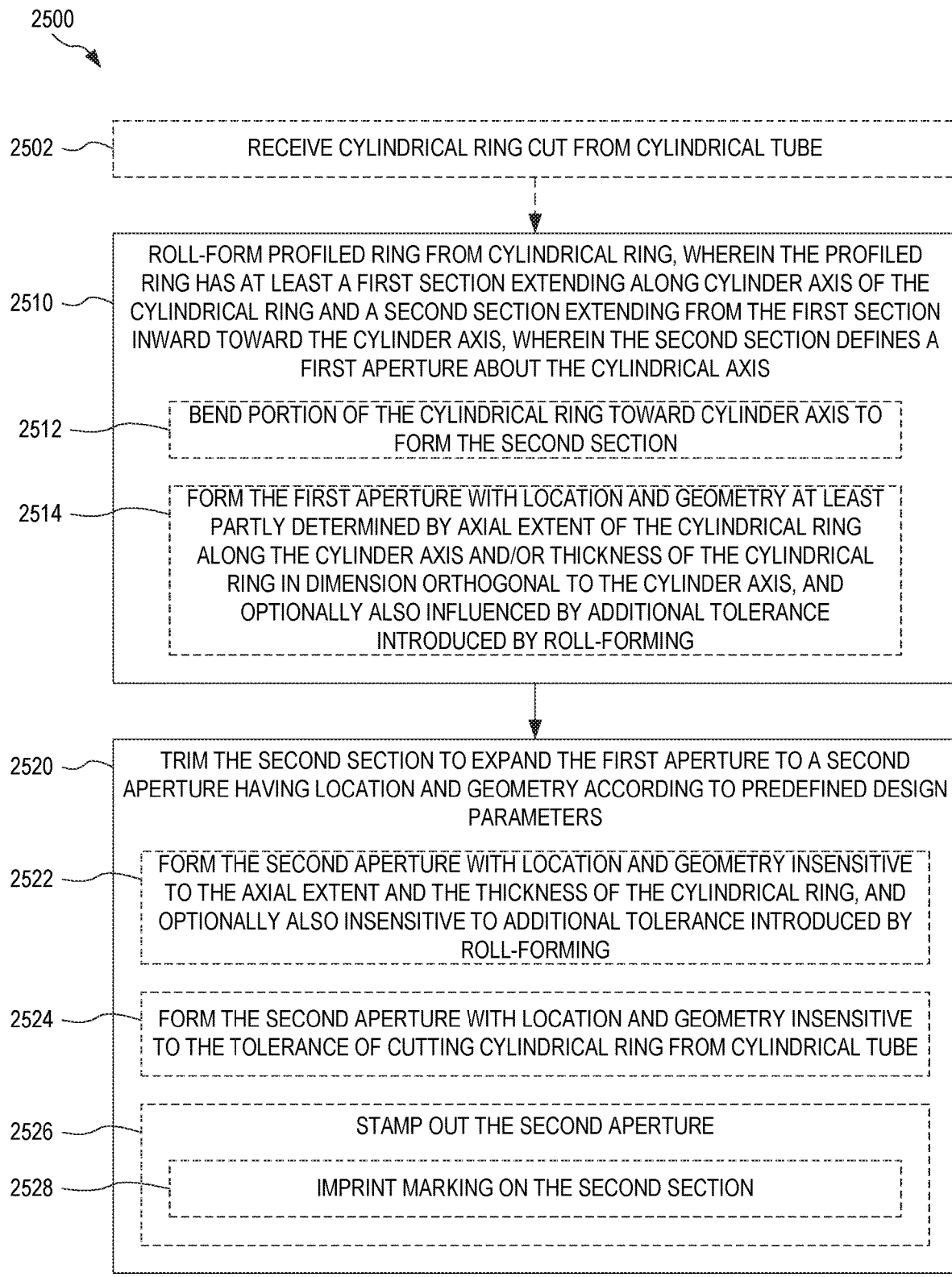
FIG. 25 illustrates a roll-forming method for manufacturing a seal case, in an embodiment which includes a step of trimming an radial section to refine an aperture.

FIG. 25 illustrates one roll-forming method 2500 for manufacturing a seal case, which includes an step of trimming an radial section to refine an aperture. Method 2500 is, for example, used to manufacture any one of seal cases 108, 600, and 800. Method 2500 applies roll-forming to cylindrical ring better utilize the input material, so as to reduce waste as compared to drawing process 1000. Method 2500 may form the seal case from cylindrical metal ring, such as a cylindrical steel ring. The trimming step reduces potential inaccuracies in the size of the central aperture of the seal case. For example, when roll-forming a seal case from cylindrical ring 1300 in the absence of the trimming step, manufacturing tolerances for axial extent 2320 may transfer to diameter 1352 of aperture 1330. The trimming step may remove the sensitivity to such tolerances.

In a step 2510, method 2500 roll-forms a profiled ring from a cylindrical ring. The profiled ring has at least an axial section extending along the cylinder axis of the cylindrical ring and a radial section extending from the axial section inward toward the cylinder axis. The radial section defines a first aperture about the cylindrical axis. Step 2510 may include a step 2512 of bending a portion of the cylindrical ring toward the cylinder axis to form the radial section. In an embodiment, step 2510 includes a step 2514 of forming the first aperture of the profiled ring with location and geometry at least partly determined by the axial extent of the cylindrical ring and/or wall thickness of the cylindrical ring. Herein, the wall thickness refers to the thickness of the wall of the cylindrical ring in the dimension orthogonal to the cylinder axis. The first aperture may also be influenced by additional tolerance introduced by the roll-forming process of step 2510. In one embodiment, step 2510 implements steps 1210, 1220, and 1230 of method 1200. In another embodiment, step 2510 implements steps 1210 and 1230, but not step 1220.

Step 2510 may be preceded by a step 2502 of receiving a cylindrical ring formed by cutting a cylindrical tube. In one example, step 2510 receives a cylindrical ring formed by method 2500. The axial extent of this cylindrical ring may be subject to manufacturing tolerances.

Figure 26:
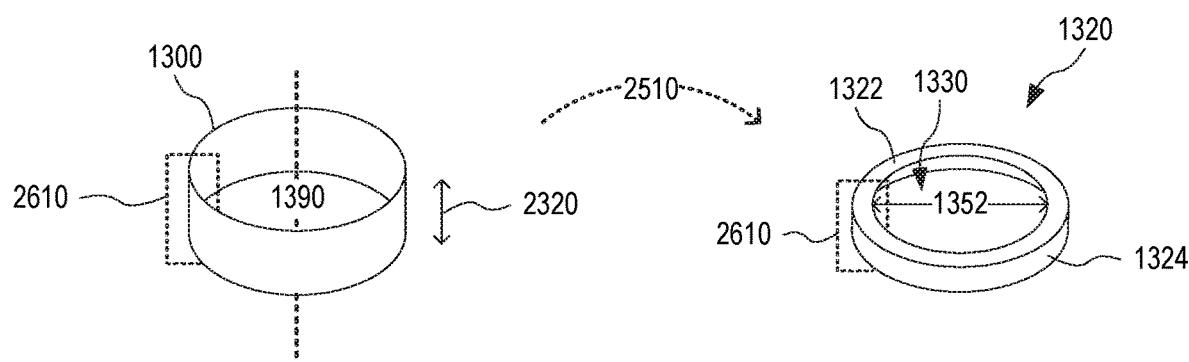
FIGS. 26 and 27 illustrate an example of at least a portion of a roll-forming step of the method of FIG. 25.
Figure 27:
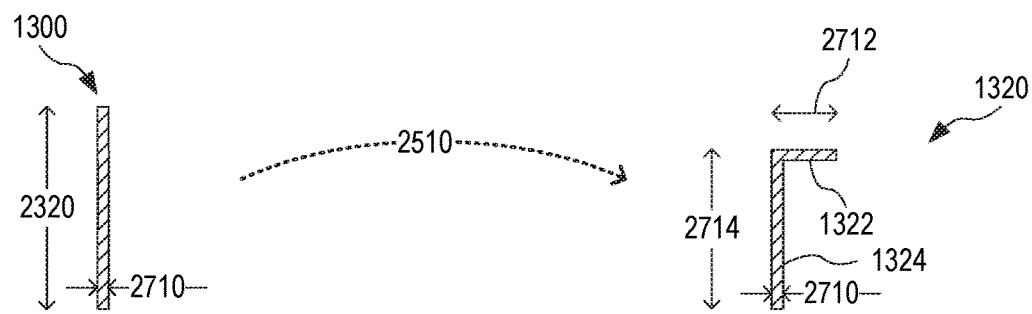

FIGS. 26 and 27 illustrate one example of at least a portion of step 2510. FIG. 26 provides a perspective view of this example and FIG. 27 shows associated cross sections 2610 indicated in FIG. 26. FIGS. 26 and 27 are best viewed together in the following description. In this example, step 2510 receives cylindrical ring 1300 having axial extent 2320, wall thickness 2710, and diameter 1354. Step 2512 forms profiled ring 1320 with aperture 1330 having diameter 1352. The value of diameter 1352 is at least partly defined by axial extent 2320 and wall thickness 2710. For example, a greater value of axial extent 2320 leads to a greater value of the radial extent 2712 of radial section 1322, and a greater value of wall thickness 2710 may also lead to a greater value of radial extent 2712. Any excess in radial extent 2712 corresponds to a reduced value of diameter 1352, and any lack of radial extent 2712 corresponds to an increased value of diameter 1352.

It is understood that step 2510 may include additional and/or more complex roll-forming operations than that shown in FIGS. 26 and 27. For example, step 2510 may form one or more steps in the diameter of axial section of the profiled ring.

Referring again to FIG. 25, method 2500 further includes a step 2520 of trimming the radial section to expand the first aperture to a second aperture having location and geometry according to predefined design parameters. In an embodiment, step 2520 includes a step 2522 of forming the second aperture with location and geometry insensitive to the axial extent and the wall thickness of the cylindrical ring, and optionally also insensitive to additional tolerance introduced by the roll-forming in step 2510. In embodiments of method 2500 including step 2502, step 2520 may include a step 2524 of forming the second aperture with location and geometry insensitive to the axial extent tolerance associated with cutting the cylindrical ring from cylindrical tube. In particular, method 2500 may accept cylindrical rings with less accurate axial extent, since step 2524 removes (or at least significantly reduces) the sensitivity to the axial extent tolerance. Thus, these embodiments of method 2500 relax the requirements to the accuracy with which the cylindrical rings are cut from the cylindrical tube. In an embodiment, step 2520 includes a step 2526 of stamping out the second aperture. Step 2526 may further include a step 2528 of imprinting a marking on the radial section of the profiled ring. Step 2528 is performed in the same stamping operation that stamps out the second aperture.

Figure 28:
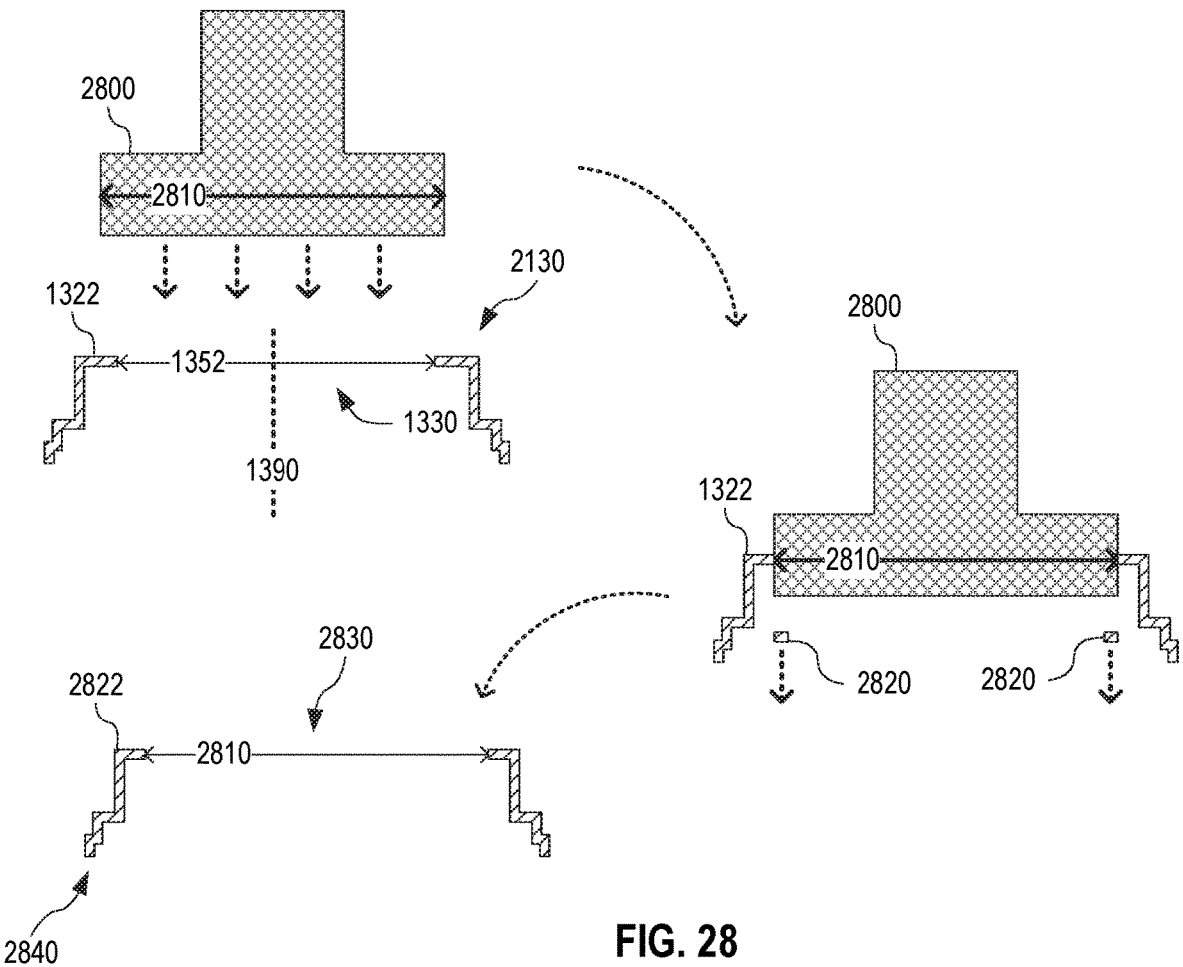
FIGS. 28 and 29 illustrate an example of at least a trimming step of the method of FIG. 25.
Figure 29:
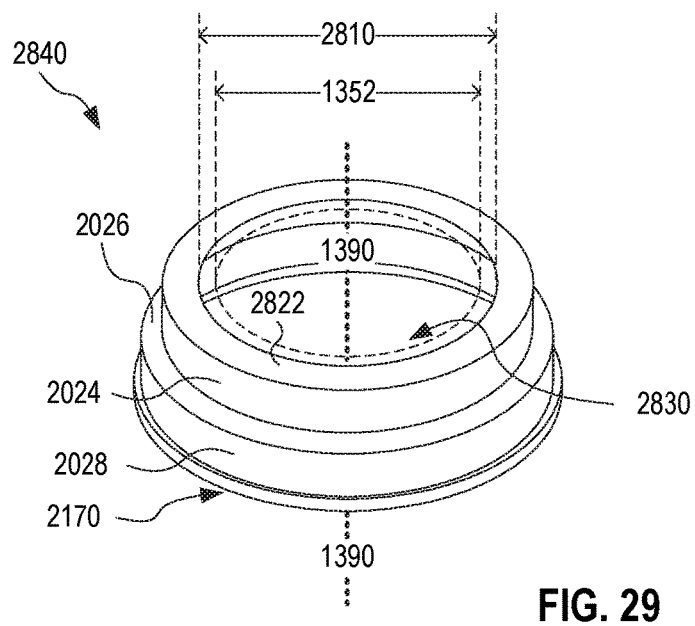

FIGS. 28 and 29 illustrate one example of step 2520 implementing step 2526. FIG. 28 shows a series of cross-sectional views of the workpiece of step 2520. FIG. 29 shows a perspective view of the final product of this example. FIGS. 28 and 29 are best viewed together in the following description.

In the example shown in FIGS. 28 and 29, step 2520 receives profiled ring 2130 having an initial aperture 1330 with diameter 1352. A stamp 2800 having diameter 2810 punches out some of radial section 1322 of profiled ring 2130 to form a modified profiled ring 2840 with a modified radial section 2822 that defines a larger aperture 2830 characterized by a diameter 2810.

Without departing from the scope hereof, aperture 1330 may deviate from perfect circularity, and aperture 2830 may have improved circularity over aperture 1330.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A roll-forming manufacturing method of a roller bearing seal case, comprising:
    roll-forming, from a cylindrical ring, a first profiled ring having a first section extending along cylinder axis of the cylindrical ring and a second section extending from the first section inward toward the cylinder axis;
    applying outward pressure to the first section at a corner where it meets the second section, in direction away from the cylinder axis, to round the first section; and
    roll-forming, after applying outward pressure to the first section, a second profiled ring from the first profiled ring.

2. The roll-forming manufacturing method of claim 1, the step of roll-forming a first profiled ring comprising bending a portion of the cylindrical ring, encircling the cylinder axis, toward the cylinder axis to form the second section while remainder of the cylindrical ring forms the first section.

3. The roll-forming manufacturing method of claim 1, the step of roll-forming a second profiled ring comprising making a plurality of bends in the first section to form a plurality of contiguous, non-parallel subsections.

4. The roll-forming method of claim 1, the step of applying outward pressure comprising:
    positioning a segmented die in a region enclosed by the first section where it forms the corner with the second section; and
    inserting a tapered key into the segmented die to press segments of the segmented die outward toward the first section.

5. The roll-forming method of claim 1, the step of roll-forming the second profiled ring comprising placing the first profiled ring in a die such that (a) a first portion of the first section contacts a first inward facing cylindrical surface of the die and (b) the first section and the first inward facing cylindrical surface are concentric.

6. The roll-forming manufacturing method of claim 5, the die being a profiled die having (a) the first inward facing cylindrical surface along a first segment of the cylinder axis, (b) a second inward facing cylindrical surface having greater diameter than the first inward facing cylindrical surface and located along a second segment of the cylinder axis adjacent the first segment, and (c) a first connecting surface connecting the first and second inward facing cylindrical surfaces, wherein the step of roll-forming the second profiled ring comprises:
    placing the first profiled ring in the profiled die such that a second portion of the first section overlaps with the second segment of the cylinder axis; and
    rolling a first roller against inward facing surface of the first section to press the second portion of the first section against the second inward facing cylindrical surface and the first connecting surface, to expand diameter of the second portion.

7. The roll-forming manufacturing method of claim 6, the die further having (d) a third inward facing cylindrical surface having greater diameter than the second inward facing cylindrical surface and located along a third segment of the cylinder axis adjacent the second segment and (e) a second connecting surface connecting the second and third inward facing cylindrical surfaces, the step of roll-forming the second profiled ring further comprising:
    rolling a second roller against the inward facing surface of the first section to press the third portion of the first section against the third inward facing cylindrical surface and the second connecting surface, to expand diameter of the third portion, so as to form the second profiled ring with an outward protruding bead configured to lock the second profiled ring into a bearing cup forming an outer race way of a roller bearing.

8. The roll-forming method of claim 1, further comprising:
    cutting a cylindrical tube to form a plurality of instances of the cylindrical ring; and
    in the step of roll-forming the first profiled ring, roll-forming the first profiled ring from one of the plurality of instances of the cylindrical ring.

9. The roll-forming method of claim 8, the step of cutting comprising cutting an extruded tube.

10. The roll-forming method of claim 8, the step of cutting comprising cutting a welded tube, the roll-forming method further comprising removing weld bead of the welded tube prior to the step of roll-forming.

* * * * *